3,193,942
ALIGNMENT GAUGE
Lawrence J. Cates, R.R. 2, Prior Lake, Minn.
Filed Mar. 3, 1964, Ser. No. 349,189
6 Claims. (Cl. 33—180)
(Granted under Title 35, U.S. Code (1952), sec. 266)

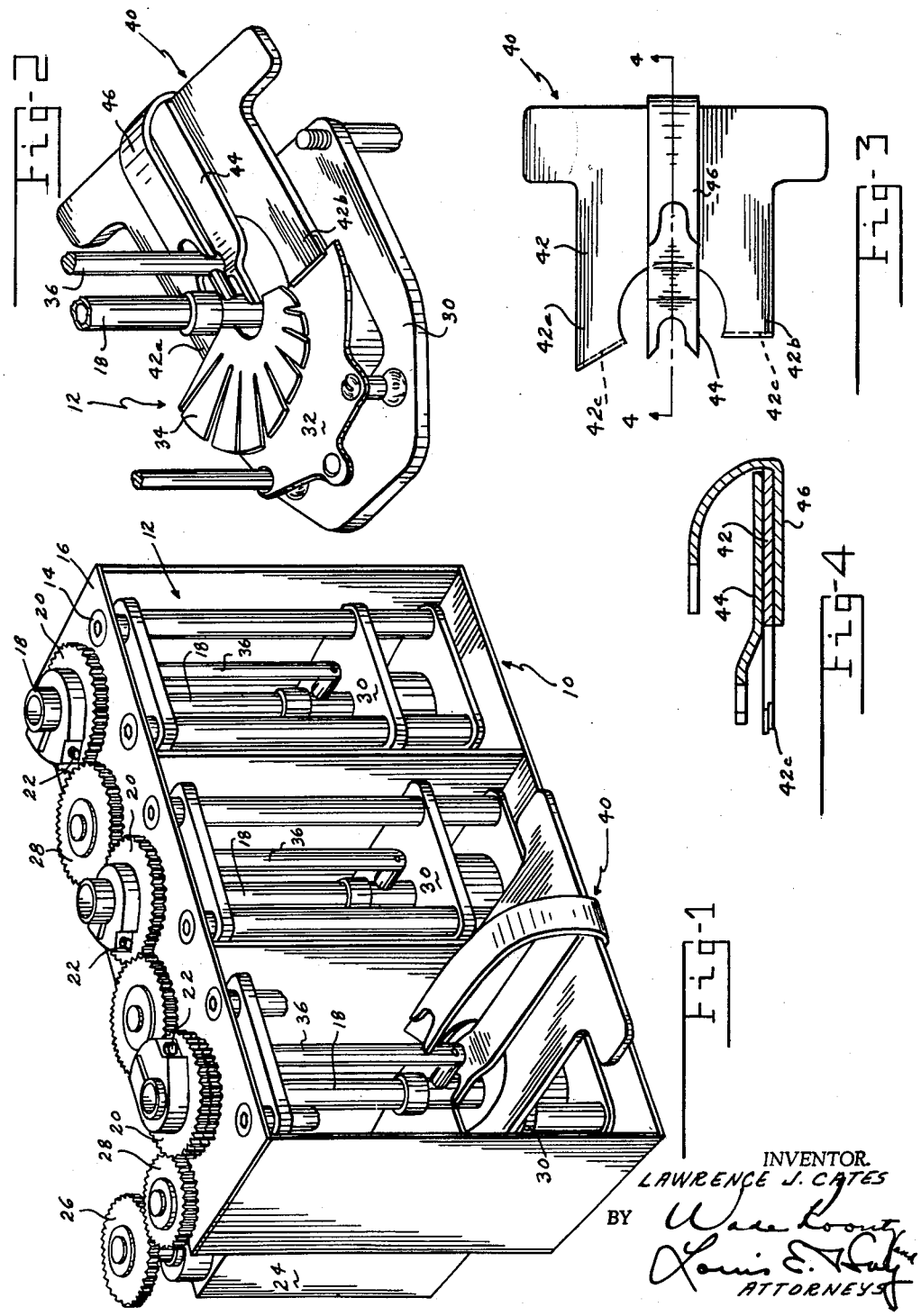

The invention described herein may be manufactured and used by or for the Government for governmental purposes without the payment to me of any royalty thereon.

This invention relates to alignment gauges of the character used for checking the angular alignment between two elements where one element is superimposed and angularly movable in relation to the other element.

The primary object of this invention is to provide an alignment gauge having three locator members in fixed relationship to set and check the angular mechanical alignment between the three electrical tuner circuits of the final power amplifier on a United States Air Force ARC-27 transmitter.

Another object of this invention is to provide an alignment gauge which will permit the mechanical angular alignment of the rotor inductance rod of a tuner circuit with the variable capacitor stator plate to the approximately correct electrical alignment position; in order to minimize the necessary bending of the rotor plate in making subsequent electrical alignment.

A further object of this invention is to provide an alignment gauge permitting the mechanical alignment of a tuner circuit to the approximate electrical position in order to eliminate short circuits and transmitter failures caused by excessive bending of the rotor plate.

Additional objects, advantages and features of the invention reside in the construction, arrangement and combination of parts involved in the embodiment of the invention as will appear from the following description and accompanying drawing wherein:

FIG. 1 is a perspective of the alignment tool in initial horizontal engagement with one of the tuners of the final power amplifier, FIG. 2 is a fragmentary perspective of the alignment gauge tilted from the initial horizontal position of FIG. 1 to straddle engage the rotor inductance rod when in proper angular alignment, FIG. 3 is a plan view of the alignment gauge, and FIGURE 4 is a cross section of the alignment gauge taken along the longitudinal axis 4—4 on FIG. 3.

Referring specifically to FIG. 1 of the drawing, there is shown the final power amplifier 10 of a transmitter, partitioned to house three tuner circuits 12 as shown. Each tuner circuit, in addition to other support means, is supported in proper position by means of a plurality of screws 14 passing through the top plate 16 of the amplifier 10. Each tuner circuit has a rotatable shaft 18 extending through top plate 16. Joined to the externally extending end of each shaft 18 is a drive gear 20 having a split hub 20a; the gear being held in place on the shaft by means of a screw 22; the tightening of which holds the gear in a squeeze fit on the shaft. The tuner circuits are simultaneously positioned by a drive means 24 driving through gear 26. Interdigitating the three gears 20 and gear 26 are idler gears 28.

Referring more specifically to FIG. 2, each tuner circuit 12 has a base plate 30 for supporting, by any convenient means, a stator plate 32. Joined to shaft 18 to be in superimposed relationship to the stator plate is a rotor plate 34; and laterally extending from and parallel with shaft 18 is a rotor inductance rod 36.

The alignment gauge 40, as shown on FIG. 3 and FIG. 4, has three necessary members for the accomplishment of its functions: (1) a first flat member 42 having forwardly extending contoured terminal ends 42a and 42b for horizontally engaging and locating against the edge of the stator plate 32; (2) a second member 44 having a forwardly extending forked end for laterally straddle engaging shaft 18, and (3) a third member 46 having a forwardly extending forked end for laterally straddle engaging the inductance rod 36. The forked ends of the second and third members may be made to any convenient configuration such as shown on the second member 44 or the third member 46. As viewed in FIG. 3, the contoured terminal ends 42a and 42b of the first member 42 are positioned and contoured to fit the edge of the stator plate 32, and are provided with step cuts 42c, as best shown on FIG. 4, to hold the gauge in place on the stator plate. While not limited to such construction, the gauge may easily be made from three pieces of relatively thin gauge flat metal which may be joined by spot welding at their rearward contacting surfaces. The second member 44 is formed at the forward end in a manner to place the forked end on a plane superimposed above the terminal ends on the first member 42, permitting it to straddle engage shaft 18 when the first member is in engagement with the stator plate 32. The third member is formed in a manner to place the forwardly extending forked end on a plane superimposed above that of the forked end on the second member. The forked end of the third member is rearwardly displaced a sufficient amount from the forked end of the second member that it will not engage the inductance rod 36 when the gauge is horizontally engaging the stator plate of a tuning circuit 12. The reason therefore will be explained hereinafter. The third member is conveniently curved to loop below the first member 42, where it is spot-welded in place. If desired, the rearward end of the third member may be shaped to join in any other convenient manner without departing from the invention.

The following procedure has been found to be effective for making the mechanical alignment of the tuning circuits in the amplifier. The positioning means 24 may be locked to some known indexing position to which the tuner circuits are to be adjusted. The set screw 22 in the drive gear 20 of the adjacent tuner circuit is loosened to free the gear from the shaft, and the alignment gauge is inserted in place as shown on FIG. 1. The shaft 18 with attached inductance rod 36 may now be rotated to a position where the inductance rod 36 may be straddle engaged by the forked end of the third member 46 when the gauge is tilted upward from the initial horizontal position to thereby verify the alignment position; after which the set screw is tightened to lock the shaft 18 to the gear train. The above procedure is repeated on the center tuner circuit and, finally, on the tuner circuit farthest removed from the positioner means 24.

It is noted that by making the forked end of the third member 46 short enough to remain out of engagement when the tool is in the horizontal position, the inductance rod may be "felt into position" when the gauge is tilted upward. It is also noted that the close proximity of the third member to the balance of the gauge allows ample working space for manually actuating the shaft and inductance rod within the frame structure of the amplifier.

It is to be understood that the embodiment of the present invention as shown and described is to be regarded as illustrative only, and that the invention is susceptible to variations, modifications and changes within the scope of the appended claims.

I claim:

1. An alignment gauge for setting and checking in a tuner circuit of a power amplifier of a radio transmitter or the like, the angular mechanical alignment of the inductance rod laterally extending from and parallel with the tuning shaft of the tuner in relationship to the stator plate, said alignment gauge comprising in superimposed fixed relationship: a first member forwardly terminating in terminal ends for locating against the edge of said stator plate, a second member joined to said first member and forwardly terminating in a forked end superimposed over the terminal ends of said first member for laterally straddle engaging said shaft, and a third member joined to said first and second members and forwardly terminating in a forked end superimposed over and rearwardly displaced from the forked end of said second member for laterally straddle engaging said inductance rod when said inductance rod is in proper angular relationship to said stator plate.

2. An alignment gauge in accordance with claim 1 in which said second and said third members are on a common longitudinal axis passing substantially through the geometric center of the forked ends on said second and said third members.

3. An alignment gauge for setting and checking in a tuner circuit of a power amplifier of a radio transmitter or the like, the angular mechanical alignment of the inductance rod laterally extending from and parallel with the tuning shaft of the tuner in relationship to the stator plate, said alignment gauge comprising a first member forwardly terminating in contoured terminal ends for locating against the edge of said stator plate, a second member, and a third member; the rearward end of said second and said third members being joined to the rearward end of said first member, said second member forwardly terminating in a forked end superimposed over the terminal ends of said first member for laterally straddle engaging said shaft, said third member forwardly terminating in a forked end superimposed over and rearwardly displaced from the forked end of said second member for laterally straddle engaging said inductance rod when said inductance rod is in proper angular relationship to said stator plate.

4. An alignment gauge in accordance with claim 3 in which said second and said third members are on a common longitudinal axis passing substantially through the geometric center of the forked ends on said second and said third members.

5. A tiltable alignment gauge for setting and checking in a tuner circuit of a power amplifier of a radio transmitter or the like, the angular mechanical alignment of the inductance rod laterally extending from and parallel with the tuning shaft of the tuner in relationship to the stator plate, said alignment gauge comprising in superimposed fixed relationship: a first member forwardly terminating in contoured terminal ends having step cuts on the forward edge for horizontally engaging and locating against the edge of said stator plate, a second member, and a third member; the rearward end of said second and said third members being joined to the rearward end of said first member, said second member forwardly terminating in a forked end superimposed over the terminal ends of said first members for laterally straddle engaging said shaft, said third member forwardly terminating in a forked end superimposed over and rearwardly displaced from the forked end of said second member a distance sufficient to have the forked end out of engagement with said inductance rod while permitting the forked end to laterally straddle engage said inductance rod when said inductance rod is in proper angular relationship to said stator plate as the rear of said alignment gauge is tilted upward from the initial horizontal position of said first member.

6. A tiltable alignment gauge in accordance with claim 5 in which said second and said third members are on a common longitudinal axis passing substantially through the geometric center of the forked ends on said second and said third members.

References Cited by the Examiner
UNITED STATES PATENTS
1,139,165   5/15   Cobb _____ 33—180

ISAAC LISANN, *Primary Examiner.*